(12) United States Patent
Lohmar et al.

(10) Patent No.: US 8,693,330 B2
(45) Date of Patent: Apr. 8, 2014

(54) MULTIPOINT DELIVERY ENTITY AND METHOD

(75) Inventors: Thorsten Lohmar, Aachen (DE); Gertie Alsenmyr, Vallentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 176 days.

(21) Appl. No.: 13/140,686

(22) PCT Filed: Dec. 18, 2008

(86) PCT No.: PCT/EP2008/067889
§ 371 (c)(1), (2), (4) Date: Sep. 8, 2011

(87) PCT Pub. No.: WO2010/069383
PCT Pub. Date: Jun. 24, 2010

(65) Prior Publication Data
US 2012/0176897 A1   Jul. 12, 2012

(51) Int. Cl.
*H04J 3/02* (2006.01)
*H04J 3/16* (2006.01)
*H04J 3/22* (2006.01)
*G06F 15/16* (2006.01)

(52) U.S. Cl.
USPC ............ 370/231; 370/462; 370/468; 709/230

(58) Field of Classification Search
USPC ................ 370/229–231, 390–401, 443–462; 709/220–229
See application file for complete search history.

(56) References Cited

U.S. PATENT DOCUMENTS

| | | | |
|---|---|---|---|
| 6,310,886 B1 * | 10/2001 | Barton | 370/462 |
| 7,310,678 B2 * | 12/2007 | Gunaseelan et al. | 709/230 |
| 8,150,383 B2 * | 4/2012 | Fersman et al. | 455/418 |
| 2005/0271037 A1 | 12/2005 | Habaguchi et al. | |
| 2007/0147836 A1 * | 6/2007 | Dong | 398/71 |
| 2007/0171198 A1 | 7/2007 | Yokozawa | |
| 2007/0180119 A1 | 8/2007 | Khivesara et al. | |
| 2008/0137685 A1 * | 6/2008 | Gunaseelan et al. | 370/468 |
| 2012/0079559 A1 * | 3/2012 | Reznik et al. | 726/1 |

FOREIGN PATENT DOCUMENTS

| | | |
|---|---|---|
| EP | 1429489 A2 | 6/2004 |
| WO | 2007/148142 A1 | 12/2007 |
| WO | 2008/119813 A1 | 10/2008 |

OTHER PUBLICATIONS

Hameed, S. et al. "Efficient Algorithms for Scheduling Data Broadcast." Wireless Networks, vol. 5, 1999.

* cited by examiner

*Primary Examiner* — Man Phan
(74) *Attorney, Agent, or Firm* — Coats & Bennett, P.L.L.C.

(57) ABSTRACT

A multipoint delivery entity for receiving multipoint transmissions from an upstream entity and delivering said multipoint transmissions downstream to multipoint receivers, said entity comprising: —a conflict detector for detecting presence of a delivery conflict among said multipoint transmissions downstream of said multipoint delivery entity, and —a conflict resolver for performing a conflict resolution procedure in the event of a delivery conflict being detected.

15 Claims, 9 Drawing Sheets

MULTIPOINT DELIVERY ENTITY AND METHOD

FIELD OF THE INVENTION

The present application relates to a multipoint delivery entity and method for receiving multipoint transmissions from an upstream entity and delivering the multipoint transmissions downstream to multipoint receivers.

BACKGROUND

In the field of communications, it is known to make multipoint transmissions, i.e. transmissions from one source to a plurality of receivers. Examples of such multipoint transmissions are multicast and broadcast transmissions. Thus the term "multipoint transmission" is used generically in the present application and claims to describe point-to-multipoint communications.

Mechanisms for multicast (e.g. sending data to a defined group of receivers, each being addressable in a multicast scheme) and broadcast (sending data to an unknown number of receivers, e.g. by using a broadcast channel to which receivers can listen) communication are sometimes provided together in a common conceptional framework, e.g. in the Multimedia Broadcast Multicast Service (MBMS) as defined by 3GPP.

Figure 1:
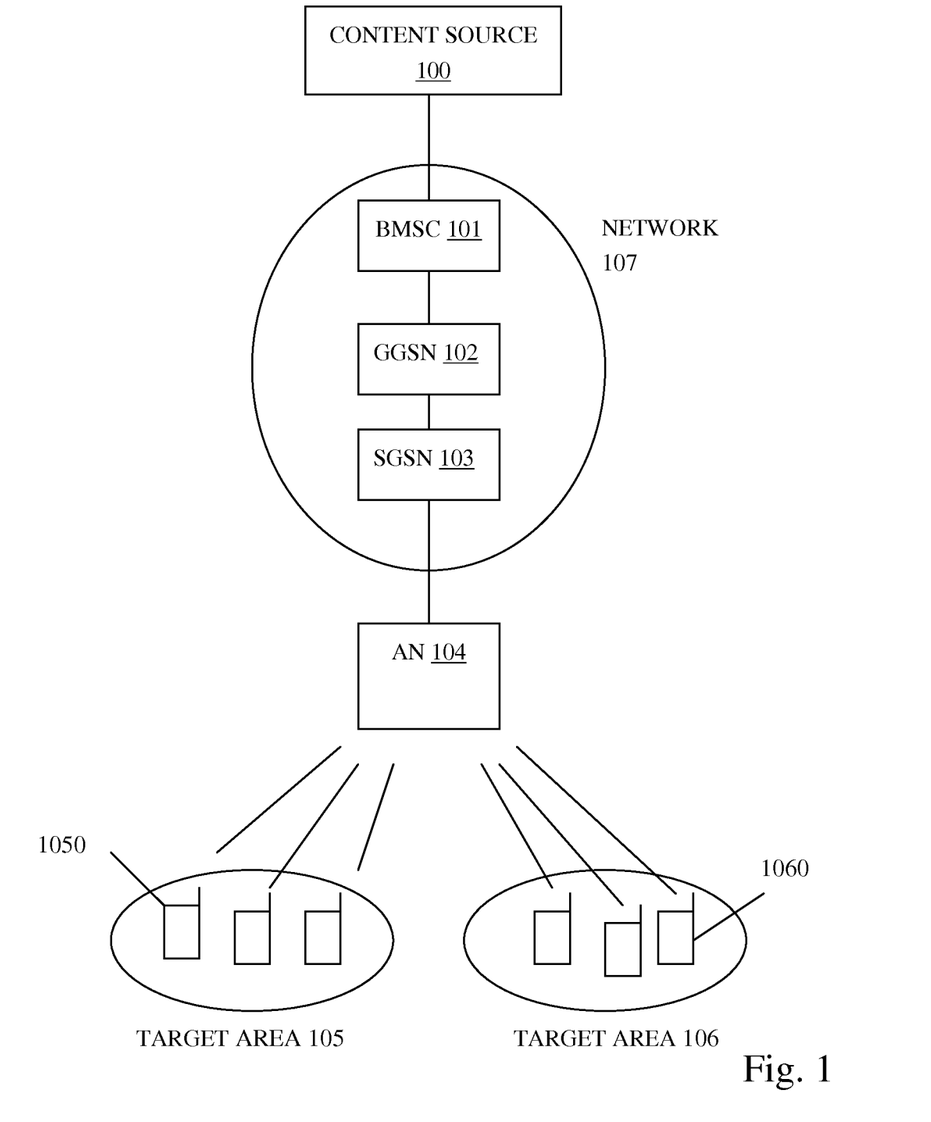
FIG. 1 is a schematic representation of communication entities involved in multipoint transmissions to a plurality of multipoint receivers.

An example of a network structure for multipoint transmissions is shown in FIG. 1. A content source 100 (e.g. a server in the Internet) supplies content to a multipoint transmission service center 101 in a given communication network 107, e.g. a core network of mobile communication network. The multipoint transmission service center 101 can then appropriately format the content into multipoint transmissions and perform appropriate signalling downstream via further entities 102, 103 and 104, towards multipoint receivers 1050 and 1060, shown as mobile terminals in the schematic example of FIG. 1. Taking MBMS as an example, entity 101 could be a Broadcast Multicast Service Center (BM-SC), 102 could be a Gateway GPRS Service Node (GGSN), entity 103 could be a Serving GPRS Service Node (SGSN), and entity 104 can be an access network or element of such an access network, such as a UMTS Terrestrial Radio Access Network (UTRAN).

SUMMARY

The object of the present invention is to provide an improved entity and method for multipoint delivery.

This object is achieved by the subject-matter of the independent claims. Advantageous embodiments are described in the dependent claims.

In accordance with an embodiment of the invention, a multipoint delivery entity is provided for receiving multipoint transmissions from an upstream entity and delivering the multipoint transmissions downstream to multipoint receivers. The multipoint delivery entity comprises a conflict detector for detecting presence of a delivery conflict among the multipoint transmissions downstream of the multipoint delivery entity, and a conflict resolver for performing a conflict resolution procedure in the event the delivery conflict being detected.

As a consequence, the multipoint delivery entity is able to detect problems that can occur downstream with respect to at least two different multipoint transmissions that come into conflict with one another, and is able to react by taking measures for resolving the detected conflict. The configuration of the conflict detector in view of what constitutes a conflict can be done in any suitable or desirable way. For example, a conflict can be defined if at least one receiver in a given target area is not able to correctly receive two different multipoint transmissions that on the level of their receipt scheduling at the multipoint delivery entity are scheduled to overlap. Another example of a conflict is if a given multipoint channel would become overloaded if transmission of a given plurality of multipoint transmissions is attempted. The conflict resolver can then also be configured in any suitable or desirable way in view of the one or more types of conflict detectable by the conflict detector. For example, if a conflict is detected in the presence of multipoint transmissions that are scheduled such that one or more intended multipoint receiver cannot properly receive at least one of the multipoint transmissions, then the conflict resolution procedure may e.g. comprise buffering one or more of the received multipoint transmissions, and performing the down stream delivery according to a modified scheduling that provides improved reception or at least an improved probability of reception. If a conflict is defined as an overload condition on a given channel, then the conflict resolution procedure can comprise steps of load reduction, which can e.g. again comprise steps of rescheduling the downstream delivery, in view of better distributing the transmission load.

The above described concept thus achieves the benefit of enhanced multipoint delivery, as a given delivery entity at a point along the flow of the multipoint transmissions is able to recognise and counter-act downstream conflicts.

BRIEF DESCRIPTION OF FIGURES

The above concept will now be explained in more detail by referring to detailed embodiments of the invention, which make reference to the Figures, where.

DETAILED DESCRIPTION

In the following, detailed examples of the present invention will be described. It is noted that often reference will be made to MBMS, which is a preferred application of the concepts of the present invention. However, it is to be noted that the inventive concepts can be applied in the context of any system for forwarding and delivering multipoint transmissions.

Figure 2:
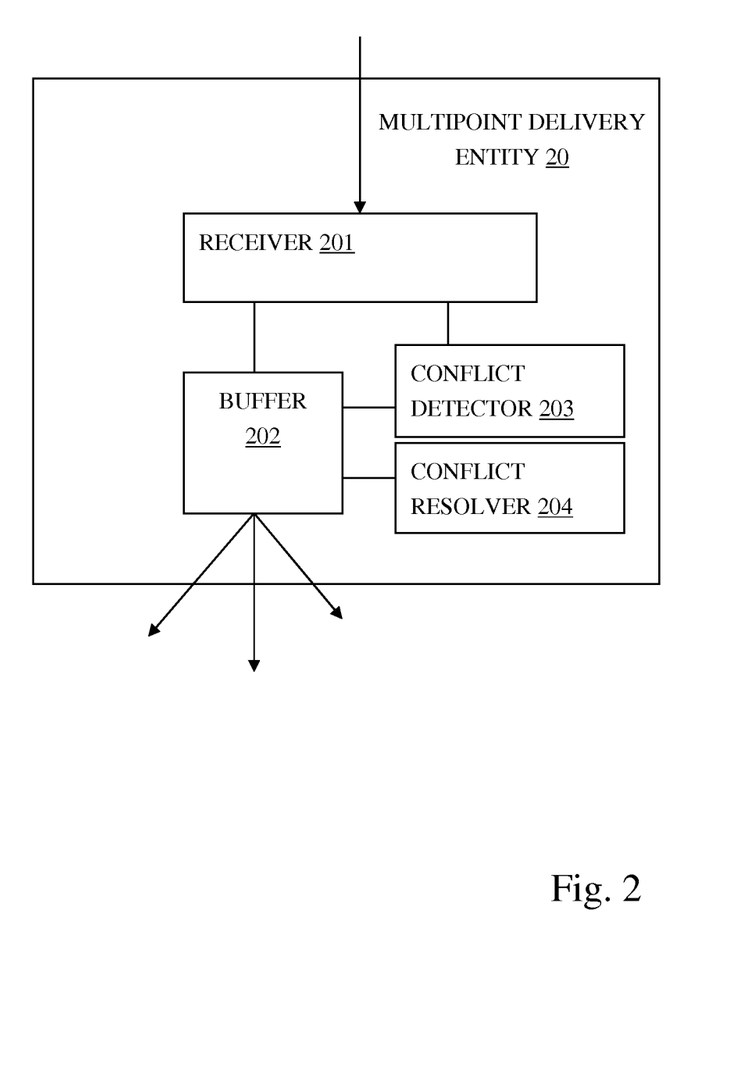
FIG. 2 is a schematic block diagram showing a multipoint delivery entity according to an embodiment of the invention.

FIG. 2 shows a schematic representation of a multipoint delivery entity for receiving multipoint transmissions from an upstream entity and delivering the multipoint transmissions downstream towards multipoint receivers. The entity 20 comprises a receiver 201, a buffer 202, a conflict detector 203 and a conflict resolver 204. The conflict detector 203 is arranged for detecting presence of a delivery conflict among multipoint transmissions downstream of the multipoint delivery entity, and a conflict resolver 204 is arranged for performing a conflict resolution procedure in the event of a delivery conflict being detected. The conflict detector 203 and conflict resolver 204 can e.g. be parts of a processing device, such as a computer programmable processor. As such, the conflict detector and conflict resolver can be provided as hardware, software or any suitable combination of hardware and software. For example, they can be put to practice as computer program parts of a control program running in the processor of a communication network node.

In FIG. 2, entity 20 is shown as a physical unit. It is, however, pointed out that the term "entity" is to be understood generically as relating to one or more physical units that provide a described functionality, such that an entity can be comprised within a single node of a network, or can be distributed over a plurality of nodes.

In the example of FIG. 1, a system of entities is shown for performing multipoint transmissions towards multipoint receivers 1050, 1060. The most upstream point is content server 100, followed by the multipoint transmission center 101, further entities 102, 103 and a further distribution point 104. As already explained before, entities 101-103 can be part of a communication network 107, such as the core network of a mobile communication system, where 101 can e.g. be a BM-SC, 102 a GGSN and 103 a SGSN. Entity 104 can be part of an access network, such as a Radio Access Network (RAN) e.g. a UTRAN. It is preferable to provide the multipoint delivery entity of the present invention as far downstream as possible, i.e. as close as possible to the multipoint receivers 1050, 1060. The reason for this is that it is preferable that conflict detection and conflict resolution be as specific as possible to multipoint receivers in a limited area, such that conflict resolution is preferably also appropriately limited, and other areas in which no conflict occurs can receive the multipoint transmissions in the regularly scheduled and desired way. Thus, in the example where entity 104 is a radio access network, the multipoint delivery entity of FIG. 2 can e.g. be provided in one or more Radio Network Controllers (RNC) of said radio access network.

However, the multipoint delivery entity comprising the detector and conflict resolver can also be provided somewhat further upstream, e.g. in entity 103 (for example a SGSN) or in entity 102 (for example a GGSN).

Naturally, the application of the invention is not limited to telephone systems or the like. As already mentioned, it can be applied in the context of any multipoint delivery system. For example, the concept of the invention can also be applied in Internet Protocol Television (IPTV). The last hop line, e.g. between the Digital Subscriber Line Access Multiplexer (DSLAM) and a household is often a so-called bottleneck link, i.e. the link having the smallest capacity and therefore being prone to overloading. If an IPTV service provider starts pushing files (e.g. using Digital Video Broadcast Internet Protocol Infrastructure (DVB-IPI)) to end users, the last hotline may be become congested or overloaded. Such a congestion or overload condition can then be implemented as a conflict condition, such that a conflict detector can appropriately recognise it, and a conflict resolver can then perform an appropriate conflict resolution, e.g. modifying the multipoint transmission scheduling on at least the congested link.

As already mentioned previously, the conflict detector can be arranged or configured such that the presence of a delivery conflict is detected if two or more multipoint transmissions are scheduled in terms of their receipt from the upstream entity that one or more multipoint receivers to which the two or more multipoint transmissions are destined downstream can not receive the two or more multipoint transmissions if they would be forwarded at the same scheduling. An example of this will be described in the following.

Such a situation can e.g. occur if one or more multipoint receivers are such that they can only receive a limited number of multipoint transmissions concurrently, e.g. because there is only a limited number of receiving channels available or configurable. For example, it is possible that only one channel is available, and that only one transmission per channel is possible at any given moment. If in such a situation two multipoint transmissions occur concurrently, and at least one of the multipoint receivers in a given target area (e.g. in a given cell of a cellular communication network) has subscribed to both multipoint transmissions, then a conflict occurs. Especially, if the one multipoint transmission starts after the other, and ends before the other, then it would be impossible for a multipoint receiver to receive both multipoint transmissions. This can e.g. be seen from the following example taken in the context of MBMS.

In MBMS, four radio channels are defined, namely three logical channels and one physical channel (the network may also use point-to-point channels, such as a dedicated channel (DCH) or a high speed downlink packet access (HSDPA) for transporting traffic data). The first radio channel is referred to as an MBMS Control Channel (MCCH) that provides access information for the MBMS transmission. The MCCH contains information whether the MBMS data is provided via point-to-multipoint or point-to-point. The second channel is the MBMS indication channel (MICH) that is similar to a paging channel, which is used to wake the terminals up for checking the MCCH. The third channel is the MBMS Traffic Channel (MTCH) that is used to provide the point-to-multipoint transportation. Finally, the fourth channel is the MBMS scheduling channel (MSCH) that serves to schedule several MTCHs on an existing so-called secondary common control physical channel (S-CCPCH). The logic channels MCCH, MTCH and MSCH are mapped together onto a Forward Access Channel (FACH), which is again mapped to the S-CCPCH. The S-CCPCH and the MICH are then furthermore multiplexed together.

Some existing mobile terminal implementations are such that they can only receive a single S-CCPCH at a time. Since the radio access network always puts a single MTCH into a single S-CCPCH, such a mobile terminal implementation can only receive a single MBMS point-to-multipoint transmission at a time. Although it is conceivable that several MSCHs are used, in which case several MTCHs could be received, it is nonetheless to be assumed that there will always be a limit to the number of simultaneously receivable physical channels. As a consequence, even if it is possible to avoid a situation of conflict between exactly two multipoint transmissions, it can be assumed that a conflict will occur if the number of simultaneous multipoint transmissions exceeds a given limit, such that the multipoint transmission that leads to the exceeding causes a delivery conflict. In the following, the scenario in which only one multipoint transmission can be received at a time, and two transmissions lead to a conflict, is assumed for simplifying the explanation.

Figure 5A:
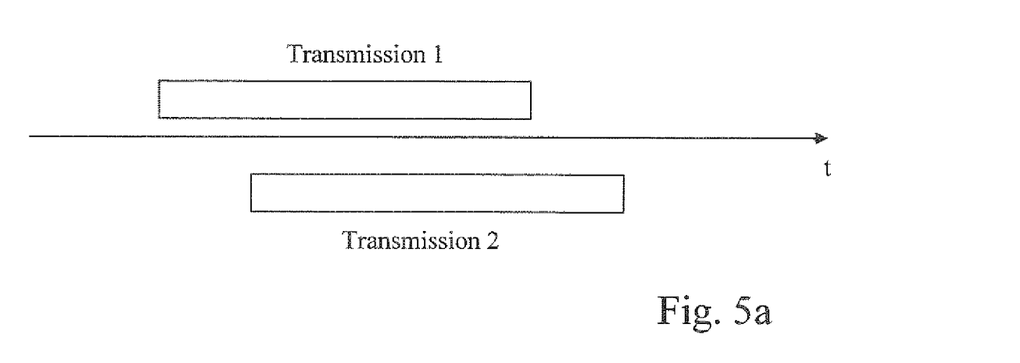
FIG. 5 shows examples of conflict situations between two multipoint transmissions.

FIG. 5a shows a case where a multipoint delivery entity receives a "transmission 1" and a "transmission 2" from an upstream entity (e.g. from the BMSC if the transmissions are MBMS transmissions) and it can be seen that the two transmissions overlap, where transmission 1 begins before transmission 2 and also ends before transmission 2 ends. It is in principle envisionable that only transmission 1 can be correctly received, whereas transmission 2 can not be correctly received, as the first part would be missing, on account of the multipoint receiver at that time being busy receiving transmission 1.

If the multipoint receivers are capable of performing a file repair procedure (as this is the case in MBMS), then the multipoint receivers wanting to receive both transmissions could use the file repair procedure to obtain missing parts of transmission 2 and thereby completely receive both transmissions. Nonetheless, it is noted that in accordance with the present invention, an overlap situation as shown in FIG. 5a, can be chosen as defining a conflict such that the conflict detector can be arranged to detect a conflict in such an event. It is thus noted that although it is preferable to define a delivery conflict such that at least one multipoint receiver can not receive the two or more multipoint transmissions, this is by no means a necessity, and a conflict can also be defined in a simple situation of overlap, as shown in FIG. 5a, which might be remedied by a disposable mechanism (such as file repair), but where it is nonetheless desirable or more efficient to conduct the conflict resolution procedure in accordance with the present invention.

Figure 5B:
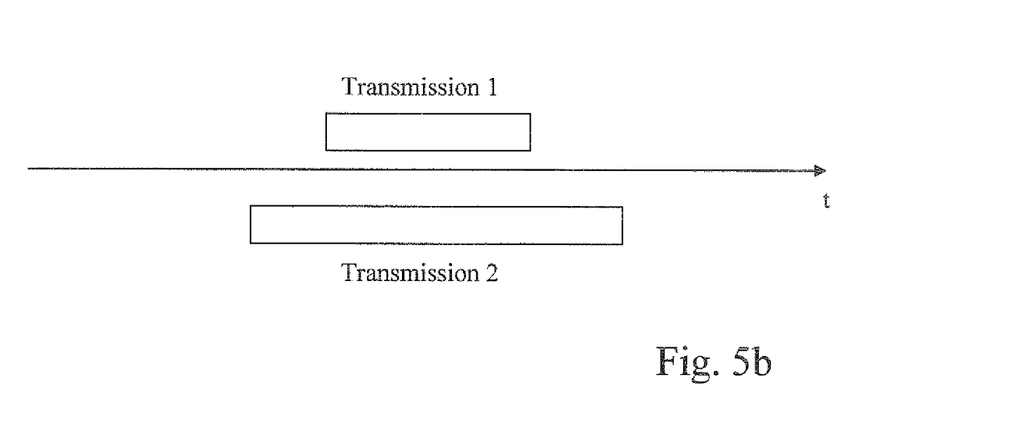

FIG. 5b shows a different case, in which transmission 2 starts before transmission 1 and ends after transmission 1. It can be seen that even if a file repair mechanism is available, then a multipoint receiver in question that wants to receive both transmissions is not able to do so, as the receiver would receive nothing of transmission 1 and therefore also not be able to perform any type of file repair procedure. Thus, the situation as shown in FIG. 5b (i.e. an overlap in the two multipoint transmissions such that one of the multipoint transmissions starts after the other end and ends before the other) is a further example of a condition that can be defined as a conflict for the purposes of triggering a conflict resolution procedure.

Figure 6A:
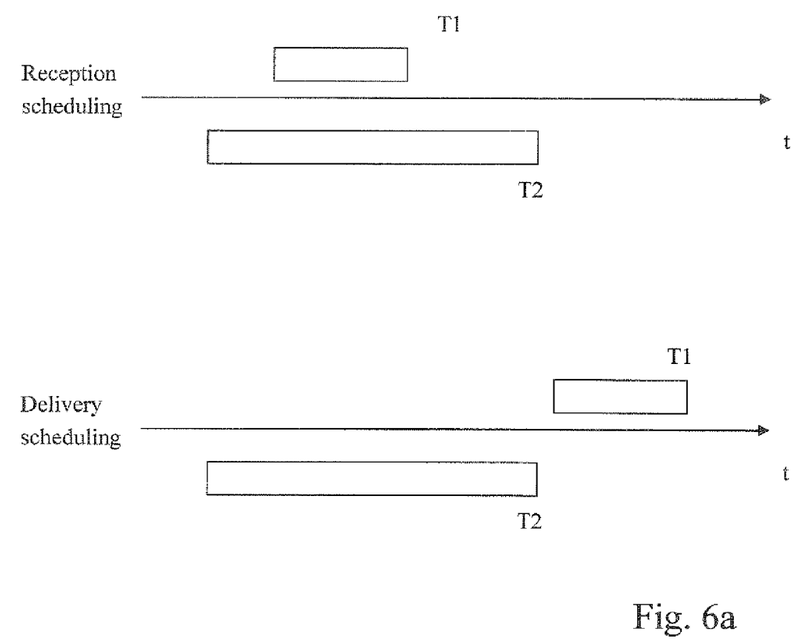
FIG. 6a-c show examples of conflict situations and conflict resolution.

The conflict resolution procedure performed by the conflict resolver is preferably such that the receipt scheduling (as e.g. shown in FIGS. 5a and 5b at the multipoint delivery entity) is modified for the downstream delivery, more specifically that the downstream delivery scheduling of at least one of the multipoint transmissions is modified. A first example is shown in FIG. 6a, where the upper portion shows a transmission 1 and a transmission 2 along the timeline as they are received from an upstream entity, and the lower portion of the Figure shows the modified scheduling for downstream delivery performed as a part of the conflict resolution procedure. In other words, the conflict detector detects the situation at the top of the Figure as a conflict, e.g. because both transmission 1 and 2 are destined for a given target area, and consequently the conflict resolution procedure is conducted, which in the example of FIG. 6a comprises buffering transmission 1 until transmission 2 has been completed, such that effectively both transmission 1 and transmission 2 can be sent over the same channel.

Figure 6B:
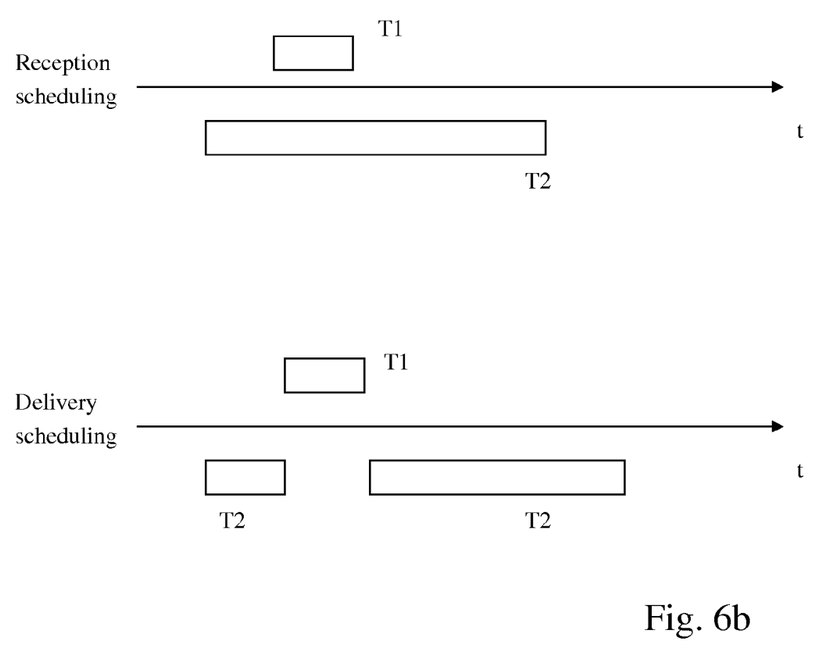

FIG. 6b shows a further example of a conflict resolution procedure, in which case after the detection that transmission 1 and transmission 2 (see top of FIG. 6b) are conflicting, the conflict resolver interrupts the delivery of transmission 2 on the given multipoint channel and delivers data from the other multipoint transmission 1 on said given multipoint channel.

Figure 6C:
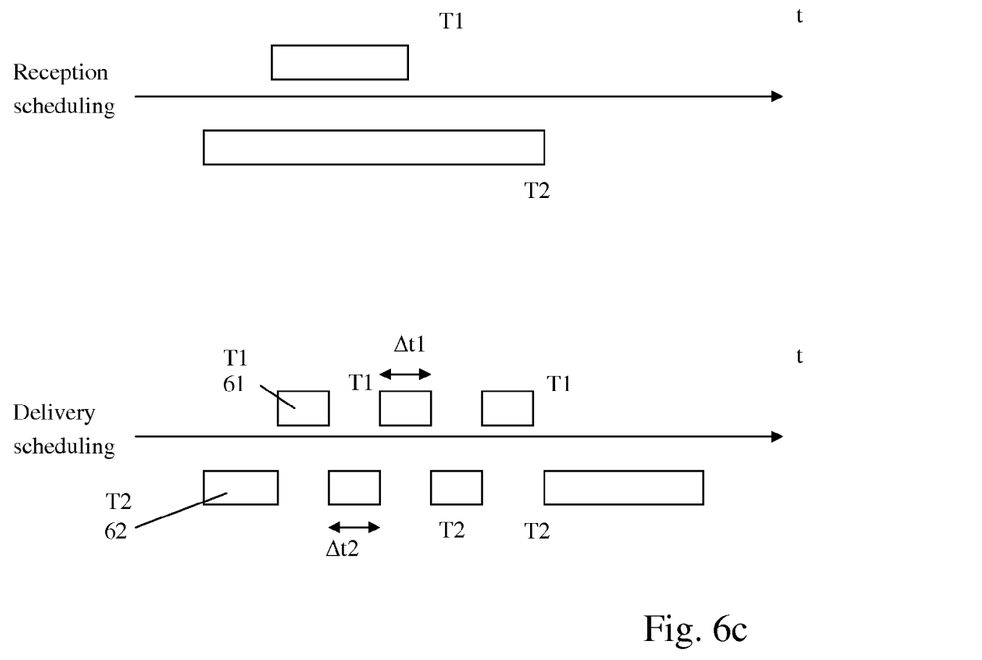

FIG. 6c shows a further example where again the upper part of the Figure shows the receipt scheduling as received from the upstream entity, and the bottom part shows the scheduling modification for downstream delivery as a reaction to detecting a conflict in the received scheduling. In the example of FIG. 6c the conflict resolver is arranged for alternating delivery of data of the first multipoint transmission 1 with the data of the second multipoint transmission 2 on the given channel.

The examples of FIGS. 6a-6c refer to conflict between two multipoint transmissions. Naturally this is only an example, and conflicts may also be identified with respect to more than two transmissions. In such a general case, data from a plurality of transmissions can be sent as shown in FIG. 6c, i.e. data is placed in blocks onto an available channel according e.g. to a round-robin scheme.

Furthermore, it is preferable that the conflict resolution procedure also comprises informing multipoint receivers in the concerned target area that the scheduling is being changed, and how it is being changed. Thus the multipoint delivery entity can provide specific "suspend information" (including the length of suspension or interruption) on which ongoing multipoint transmissions will be interrupted (like T2 in FIGS. 6b and 6c), and furthermore on the new transmission that is being interleaved with the ongoing transmission (like T1 in FIGS. 6b and 6c).

In some multipoint transmission schemes it is known to transport one or more information elements in a multipoint transmission, where the information element conveys information related to the multipoint transmission. Such information can e.g. be a name of the file being transmitted as a multipoint transmission, and information on such a file, for example file length, file format, etc. An example of such an information element is a FLUTE (File Delivery over Uni-Directional Transport) File Delivery Table (FDT) in the context of MBMS. According to a further embodiment, if the multipoint transmissions include one or more such information elements, then the conflict resolver and consequently the conflict resolution procedure is preferably arranged so as to adjust the delivering of data from at least one of the conflicting multipoint transmissions on the given multipoint channel in such a way that the information element for that multipoint transmission is delivered. Preferably, the scheduling modification is done in such a way that the respective information element for each of the conflicting multipoint transmissions is delivered. In the example of FIG. 6c, this can e.g. mean that the length of the initial block 61 of transmission 1 and the length of the initial block 62 of transmission 2 are chosen such that an information element is necessarily included.

Furthermore, in the event that the multipoint transmissions are arranged to include the information element at regular intervals, then the conflict resolver and conflict resolution procedure are preferably arranged to send blocks of data from at least one of the multipoint transmissions and to adjust the time span of blocks for delivering data from the concerned multipoint transmission on the given multipoint channel such that at least one information element or the given multipoint transmission is delivered per block. Preferably, if both conflicting multipoint transmissions are transmitted block-wise (as e.g. shown in FIG. 6c), then the time span for the blocks of both transmissions are preferably chosen such that at least one information element is delivered per block. Thus, considering the example FIG. 6c, the time span $\Delta t1$ for the blocks of transmission 1 and the time span $\Delta t2$ for the blocks of transmission 2 are chosen long enough, such that each block contains an information element, such as a FLUTE FDP. For example, if the regular contiguous multipoint transmission as received comprises an information element every x seconds, when the time spans $\Delta t1$ and $\Delta t2$ are chosen to be larger then the value x. For the example of MEMS, $\Delta t1$ and $\Delta t2$ can e.g. be chosen to be equal to 10 seconds. As can be seen, $\Delta t1$ and $\Delta t2$ can be chosen to have the same value, but it is equally possible to choose different values for the different multipoint transmissions.

The benefit of ensuring that at least one information element, and preferably one information element per block is delivered, is that the multipoint receiver thereby receives the suitable information for identifying the transmission it is receiving, even if it is only receiving a part of a larger transmission. Furthermore, it is known in multipoint communications to provide a repair procedure or repair mechanism for multipoint transmissions, according to which a receiver can obtain missing parts of a received multipoint transmission, which missing parts were either received with defects or not received at all. In the event of such a repair mechanism being present, it is again very advantageous that each block of data transmitted for a given transmission contain the information element such that the receivers in questions have the opportunity of appropriately performing a repair procedure if necessary.

In connection with such file repair mechanisms, it is also known to possibly provide a time value for letting a multipoint receiver commence the repair procedure. For example, in the context of MBMS the BM-SC may set an expiration time (the so-called FDT expire time), which is a point in time that the receiver uses to consider delivery of the multipoint transmission to be over at the latest (the receiver may also consider delivery to be over when receiving an explicit end of file or end of session message), such that a repair procedure is begun after that point in time, If the multipoint receivers are arranged to perform such a repair procedure that is commenced based on a time value set by an upstream entity (such as the BM-SC), then the conflict resolver and conflict resolution procedure is preferably arranged to take into account this time value. In other words, the conflict resolver and conflict resolution procedure is preferably arranged to perform the scheduling modification for downstream delivery of the multipoint transmissions in such a way that a repair procedure in multipoint receivers is not unnecessarily triggered. According to an embodiment of the invention, this can e.g. be achieved by controlling the buffer 202 in the entity 20 of FIG. 2 to have a maximum buffering length that is chosen in dependence on the time value set by the upstream entity for commencing the repair procedure. For example, if the upstream entity (e.g. the BM-SC) is arranged to always set the time value (e.g. the EDT expire time) to a predetermined value, such as 20 seconds, then the multipoint delivery entity can buffer data from a given multipoint transmission or up to this value (e.g. 20 seconds) without provoking a multipoint receiver to commence the repair procedure on account of the delivery delay due to modified scheduling. Using the example of 20 seconds, the multipoint delivery entity can then always buffer up to 20 seconds of data from a given transmission.

According to a further preferred embodiment, the conflict resolver and conflict resolution procedure can be enabled to drop buffered data if a buffering length exceeds the maximum buffering length. Namely, as the maximum buffering length is arranged in accordance with the time value for commencing the repair procedure, it can be assumed that multipoint receivers will obtain missing parts of the multipoint transmission with the repair procedure if the maximum buffer length for a transmission has been exceeded so that it could be inefficient to continue the delivery of the buffered transmission, as the multipoint receivers will in any case perform the repair procedure.

It is noted that the buffering length can be defined in any suitable or desirable way. Preferably, it is defined as a time value, thereby standing in direct correspondence with the time value set for commencing the repair procedure. In other words, the buffering length is measured in seconds of transmission or delivery. However, the buffering length can also be defined in any equivalent way, e.g. as a data amount, which is then placed into correspondence with the time value set for commencing the repair procedure by taking into account the transmission data rate.

As has been previously described, the conflict detector and conflict detection procedure detects presence of a delivery conflict among multipoint transmissions downstream of the multipoint delivery entity. In other words, the conflict detector can be arranged to detect a conflict if just a single multipoint receiver among all possible downstream multipoint receivers served by the entity is judged as potentially having a conflict with respect to at least two different multipoint transmissions.

However, in order to be able to apply the conflict resolution only where necessary, it is preferable to arrange the multipoint delivery entity in such a way that it provides multipoint delivery services to a plurality of discernable multipoint target areas and to arrange the conflict detector and conflict detecting procedure in such a way that the presence of a delivery conflict among the multipoint transmissions is done on a per target area basis. This can e.g. be seen from the example of FIG. 1, in which entity 104 is schematically shown as providing multipoint delivery services to a target area 105 and a target area 106. The target areas can be chosen in any suitable or desirable way, and a target area can thus be a single cell of a cellular communication network, a plurality of such cells, or e.g. all of the cells served by the entity, e.g. all cells served by the radio network controller (RNC). Other selections for a target area are possible, e.g. a target area can also be a soft-combining area.

Returning to the example of FIG. 1, entity 104 is preferably capable of discerning the presence of a delivery conflict in target area 105 and target area 106, and the conflict resolver and conflict resolution procedure is accordingly arranged to only perform conflict resolution in a target area in which a delivery conflict was detected. As an example, entity 104 might receive transmissions 1 and 2 as shown at the top of the FIG. 6c, and be capable of seeing that target area 105 is only to receive transmission 1, such that there is no conflict there. On the other hand, entity 104 can identify that at least one multipoint receiver in target area 106 should receive both transmissions 1 and 2, and thus the entity judges the presence of a delivery conflict downstream in target area 106 and consequently performs a conflict resolution procedure as e.g. shown at the bottom of FIG. 6c for target area 106.

It is noted that the conflict resolution procedure will typically also comprise a step of informing the receivers of multipoint transmission 2 (e.g. all receivers subscribing a certain information service) that the delivery of transmission 2 will be suspended or interrupted, in order to be able to send data for multipoint transmission 1 over the same channel. Such signalling can be done in any suitable or desirable way, e.g. using the previously described MBMS control channel in the context of an MBMS multipoint transmission.

As can be seen, the conflict resolution procedure can lead to delays in the delivery in or more multipoint transmissions. If for example two multipoint transmissions are multiplexed onto a single channel (such as a single S-CCPCH), then throughput is reduced by about 50%. It can thus be seen that the concept of the present invention is preferably applied in the context of multipoint download sessions, and is not always applicable for streaming sessions, where time delays might be critical. It is thus preferable that the upstream entity (such as the BMSC) adds an indication at the beginning of a multipoint transmission, for informing the multipoint delivery entities downstream of whether or not the conflict detection and conflict resolution mechanisms of the present invention may be applied or not. For example, if a session is a streaming session, then the upstream entity can set a flag for disabling application of the conflict detection and conflict resolution.

In the event that multipoint receivers use the previously described repair mechanism that involves a time value for commencing the repair procedure (such as the FTT expire time in MBMS), then it is furthermore preferable that the upstream entity (e.g. the BM-SC) also includes an indication of the maximum buffering length or maximum buffering time at the beginning of a multipoint transmission, thereby informing the multipoint delivery entities downstream of how to adjust the maximum buffering length.

A simple implementation in an entity 104, e.g. in an RNC can be such that the entity 104 receives a start indication for a download session (a new indication or possibly derived from an information element indicating a session duration), then the entity 104 checks the provided session duration length (e.g. information element "MBMS session duration length" known from MBMS). If the entity 104 identifies that the new session will finish at least a predetermined period (e.g. 20 seconds) earlier than an ongoing session, then the entity 104 judges this to be a conflict and consequently performs a conflict resolution procedure, as e.g. shown in one of FIGS. 6a to 6c.

As described previously the application of the concepts of the present invention in the context of a mobile communication system are a preferred application. However, the invention can be applied in the context of any multipoint delivery system, for example also for IPTV. In this sense, the entity 104 shown in FIG. 1 could also be a delivery point of such an IPTV system, and target areas 105 and 106 could be different households subscribing to the IPTV service.

Figure 3:
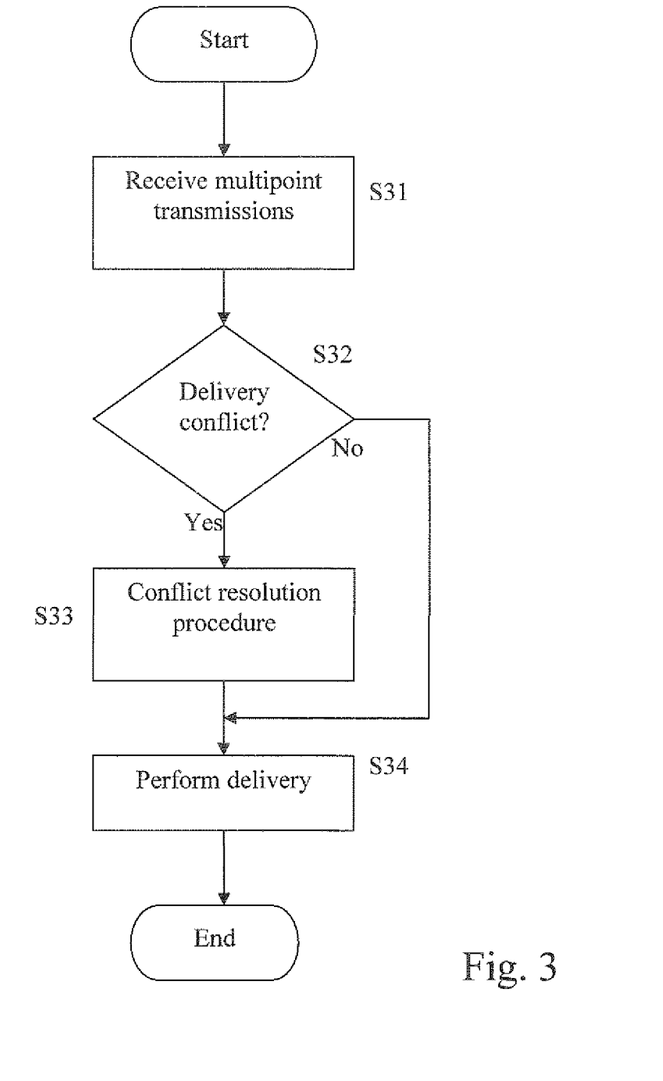
FIG. 3 is a flowchart showing a basic method embodiment of the invention.

FIG. 3 shows a flowchart of a basic method embodiment of the present invention, more specifically a method of controlling a multipoint delivery entity (such as entity 20 shown in FIG. 2) that is arranged for receiving multipoint transmissions from an upstream entity and delivering the multipoint transmissions downstream to multipoint receivers. In a first step S31 two or more multipoint transmissions are received from an upstream entity, such as a BMSC. Then, in step S32, it is analyzed whether a delivery conflict among the multipoint transmissions is detected. If yes, then a conflict resolution procedure S33 is performed, otherwise step S33 is skipped and delivery is performed without the conflict resolution procedure, step S34. The delivery conflict detection procedure S32 can be performed in any of the above described ways, and equally the conflict resolution procedure S33 can also be performed in any of the above described ways.

Figure 4:
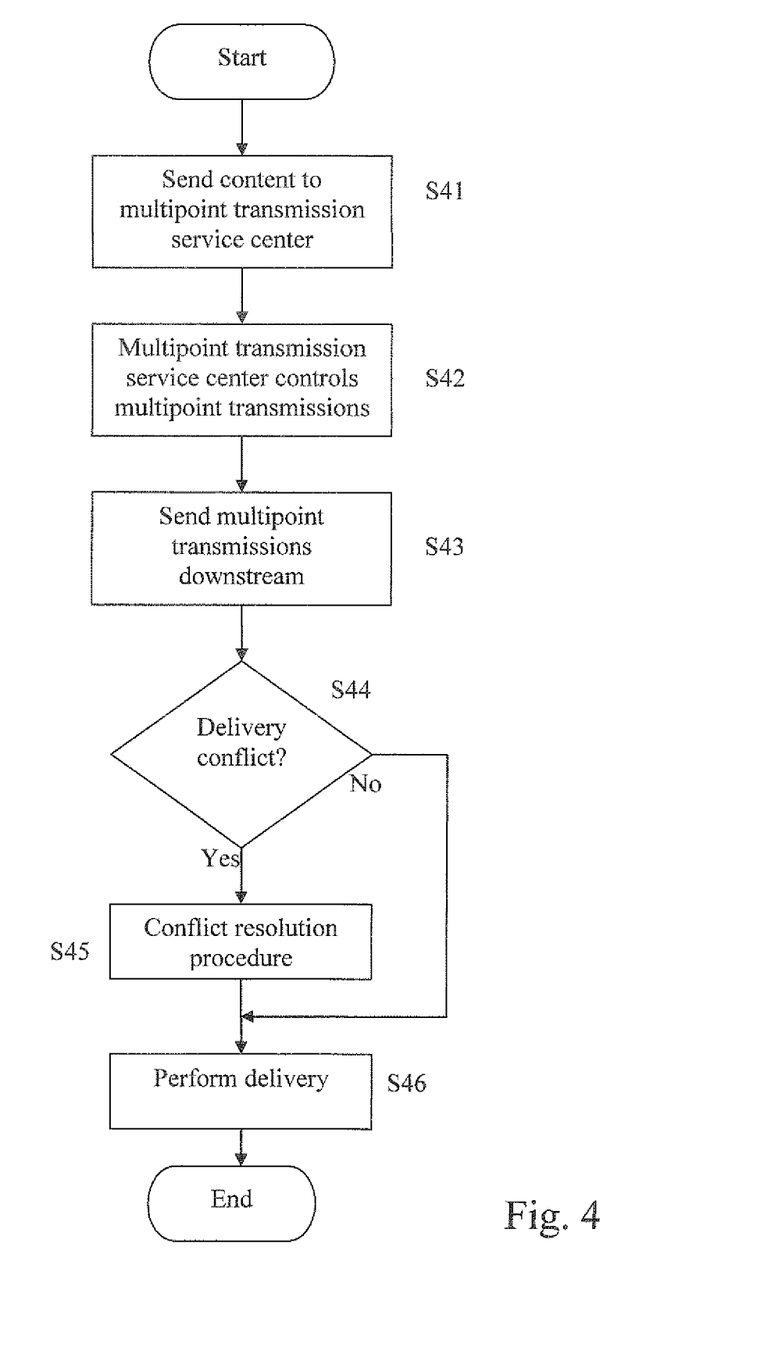
FIG. 4 shows a flowchart of a further method embodiment of the present invention.

FIG. 4 shows a flowchart of a further method embodiment of the present invention. In a first step S41 content to be used for multipoint transmissions is sent from a content server (such as content server 100 in FIG. 1) to a multipoint transmission service center, such as entity 101 in FIG. 1. The multipoint transmission service center controls multipoint transmissions towards multipoint receivers, e.g. by appropriately formatting the content and performing appropriate signalling in accordance with the multipoint communication rules employed in the communication system, see step S42. Then, in step S43 the multipoint transmissions are sent downstream, to a multipoint delivery entity, such as one of the entities 102, 103 or 104 shown in FIG. 1. For example, the multipoint delivery entity can be a Radio Network Controller (RNC) in a Radio Access Network (RAN). Furthermore, as shown in step S44, the multipoint delivery entity performs a procedure for detecting presence of a delivery conflict among the multipoint transmissions downstream of the multipoint delivery entity (e.g. in one or more target areas comprising multipoint receivers), and performing a conflict resolution procedure S45 in the event of a delivery conflict being detected in step S44. Finally, the multipoint transmissions are delivered downstream to the multipoint receivers in accordance with a result of the conflict resolution procedure, step S46. In other words, if there is no conflict, then the multipoint transmissions can be delivered according to the scheduling with which they were received at the multipoint delivery entity, and on the other hand, if a conflict was detected, then the conflict resolution may lead to a modified scheduling of at least one of the multipoint transmissions, such that the delivery of step S46 then corresponds to the modified delivery schedule (see e.g. bottom parts of FIGS. 6a-6c).

Figure 7:
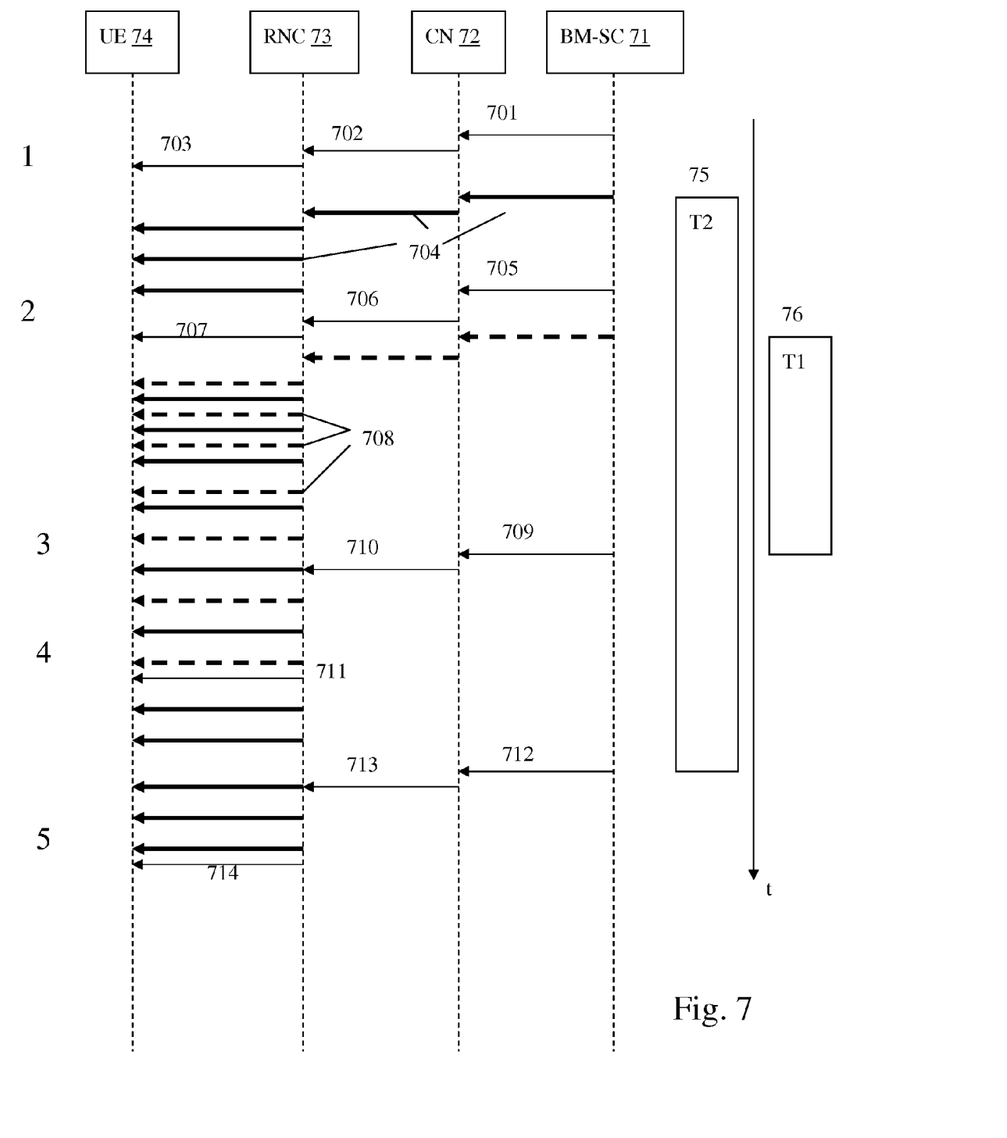
FIG. 7 shows a detailed message and signalling flow in an example of the present invention.

Now a detailed example of a sequence of messages exchanged between some of the previously described entities will be explained in connection with FIG. 7, which specifically refer to the example of MBMS. Reference numeral 71 refers to a multipoint transmission service center, such as a BM-SC. Reference numeral 72 describes a core network entity, such as one of the entities 102, 103 shown in FIG. 1. Reference numeral 73 refers to a multipoint delivery entity of the present invention, found e.g. in a radio access network, such as for example in a Radio Network Controller (RNC). Finally, reference numeral 74 refers to user equipment (UE) arranged for acting as a multipoint receiver. Time progresses from top to bottom, and reference numerals 75 and 76 refer to two transmissions 2 and 1, respectively, which are to be provided to a plurality of multipoint receivers, among them the user equipment 74, which is thus shown as an example of a plurality of such receivers.

In the following example, it is assumed that the multipoint delivery entity 73 sends a dedicated suspend message that contains the duration of the transmission suspension and possibly also information on the MBMS download transmission that it sent while the other is suspended or interrupted. Such information can e.g. be sent via the MSCH. As an alternative such scheduling can also be indicated using the MICH and the MCCH only, but this would take longer. It is furthermore noted that the basic sequences communications shown in FIG. 7 can also be applied in the case of IPTV and DSLAM buffers, but in this case there would be no MSCH or MCCH, and it would be assumed that the applications in the receivers always listen to the IP bearer.

As can be seen, transmission 1 and transmission 2 are received with scheduling that corresponds to the case explained previously in connection with FIG. 5b. In an initial phase 1 the service layer sends session start messages 701, 702, which are then appropriately acknowledged. The multipoint delivery entity 73 sends a notification 703 to the user equipment 74 with the help of MICH and MCCH. Subsequently, as indicated by arrows 704 the download of MBMS data corresponding to multipoint transmission 2 is performed.

Reference numeral 2 indicates the phase that begins when multipoint transmission 1 starts. It is assumed that the multipoint delivery entity in a given target area has identified from the "MEMS session duration" information that multipoint transmission 1 finishes before multipoint transmission 2 comes to an end, and consequently performs a scheduling modification as a conflict resolution. The multipoint delivery entity 73 furthermore sets a maximum buffer length to ensure that the buffering does not exceed the point in time before the multipoint receivers start with the file repair procedure for the transmission. Session start messages 705, 706 are again sent by the service layer and multipoint delivery entity 73 sends a notification and scheduling message 707 to the user equipment 74. The new scheduling information may indicate the suspension of service for multipoint transmission 2 for a given period Δt2 (a period between 2 and 10 seconds for example), and equally provides information on the new multipoint transmission 1. As can be seen, blocks of data from both transmissions 1 and 2 are then alternated as shown by solid arrows 704 and dash line arrows 708.

Reference numeral 3 indicates a point in time when all of the data of multipoint transmission 1 has been received at the multipoint delivery entity 73 and also corresponding session stop messages 709, 710 have been transmitted and received. The multipoint delivery entity may at this point set a timer to delete remaining data from the buffer after expiration of said timer.

Reference numeral 4 indicates a point in time when the mentioned buffer relating to multipoint transmission 1 is empty. Thus, the multipoint delivery entity has transmitted all data relating to multipoint transmission 1 and correspondingly stops sending scheduling information, and sends an end of transmission message 711. The TMGI (Temporary Mobile Group Identifier) for multipoint transmission 1 is accordingly removed from the MCCH. Subsequently, the multipoint delivery entity receives session stop messages 712, 713 for multipoint transmission 2, but continues transmitting, as there is still data for transmission 2 in the buffer.

Finally, reference numeral 5 indicates the point in time when the buffer is empty for multipoint transmission 2, and correspondingly the TMGI for multipoint transmission 2 is also removed from the MCCH and an and of transmission message 714 is sent.

Although the invention has been described by making reference to detailed embodiments, these only serve to provide a better understanding of the invention, but are by no means intended to be limiting. Rather, the invention is defined by the appended claims.

Also, reference signs and numerals in the claims have no limiting effect.

The invention claimed is:

1. A multipoint delivery entity for receiving multipoint transmissions from an upstream entity and delivering said multipoint transmissions downstream to multipoint receivers as multimedia broadcast multicast service transmissions, said entity comprising:
   a conflict detector for detecting a presence of a delivery conflict with respect to scheduling among said multipoint transmissions downstream of said multipoint delivery entity; and
   a conflict resolver for performing a conflict resolution procedure in the event of a delivery conflict being detected;
   wherein the conflict resolution procedure comprising:
      modifying a delivery scheduling of at least one of the multipoint transmissions with respect to a receipt scheduling of the at least one multipoint transmissions to generate a modified delivery schedule;
      delivering at least one of the multipoint transmissions in accordance with the modified delivery schedule; and
      providing, to the multipoint receivers in a target area, suspend information regarding which of the multipoint transmissions to the multipoint receivers in the target area will be interrupted or suspended.

2. The multipoint delivery entity of claim 1, wherein said conflict detector is configured to detect said presence of a delivery conflict if two or more of said multipoint transmissions are scheduled such that one or more of said multipoint receivers to which said two or more multipoint transmissions are destined can not receive said two or more multipoint transmissions at the same time.

3. The multipoint delivery entity of claim 1, wherein a first multipoint transmission and a second multipoint transmissions having been detected to be conflicting, said conflict resolver configured to interrupt the delivery of the first multipoint transmission on a given multipoint channel to deliver the second multipoint transmission on said given multipoint channel.

4. The multipoint delivery entity of claim 3, wherein said conflict resolver is configured to alternate delivery of said first multipoint transmission with data of said second multipoint transmission on said given channel.

5. The multipoint delivery entity of claim 3, wherein said first and second multipoint transmissions include an information element, and wherein said conflict resolver is configured to adjust the delivery of the second multipoint transmission on said given multipoint channel such that the information element for said second multipoint transmission is delivered.

6. The multipoint delivery entity of claim 5, wherein said multipoint transmissions include said information element at regular intervals, and wherein said conflict resolver is configured to send blocks of data from said second multipoint transmission and adjust a time span for delivering the second multipoint transmission on said given multipoint channel such that at least one information element for said second multipoint transmission is delivered per block.

7. The multipoint delivery entity of claim 1, wherein when said multipoint receivers are arranged to perform a repair procedure for repairing received multipoint transmissions, said repair procedure commencing based on a time value set by said upstream entity, said conflict resolver is configured to take into account said time value when performing said conflict resolution procedure.

8. The multipoint delivery entity of claim 7, wherein said conflict resolution procedure buffers at least one of said multipoint transmissions, and wherein a maximum buffering length depends on said time value.

9. The multipoint delivery entity of claim 8, wherein said conflict resolver is configured to drop buffered data if a buffering length exceeds said maximum buffering length.

10. The multipoint delivery entity of claim 1, wherein said multipoint delivery entity is configured to provide multipoint delivery services to a plurality of discernible multipoint target areas, and wherein said conflict detector is configured to detect the presence of a delivery conflict among said multipoint transmissions per target area.

11. The multipoint delivery entity of claim 1, wherein said multipoint delivery entity is comprised in an access network of a mobile communication system.

12. The multipoint delivery entity of claim 1, wherein said multipoint transmissions comprise Multimedia Broadcast Multicast Service transmissions.

13. A method of controlling a multipoint delivery entity arranged for receiving multipoint transmissions from an upstream entity and delivering said multipoint transmissions downstream to multipoint receivers as multimedia broadcast multiservice transmissions, said method comprising:
   detecting a presence of a delivery conflict with respect to scheduling among said multipoint transmissions downstream of said multipoint delivery entity; and
   performing a conflict resolution procedure in the event of a delivery conflict being detected;
   wherein the conflict resolution procedure comprises:
      modifying a delivery scheduling of at least one of the multipoint transmissions with respect to a receipt scheduling of the at least one multipoint transmissions to generate a modified delivery schedule;

delivering at least one of the multipoint transmissions in accordance with the modified delivery schedule; and providing, to the multipoint receivers in a target area, suspend information regarding which of the multipoint transmissions to the multipoint receivers in the target area will be interrupted or suspended.

14. A computer program product stored in a computer readable medium and comprising computer program code parts configured, when loaded into and executed on a programmable multipoint delivery entity, to:

detect a presence of a delivery conflict with respect to scheduling among said multipoint transmissions downstream of said multipoint delivery entity; and perform a conflict resolution procedure in the event of a delivery conflict being detected;

wherein the conflict resolution procedure comprises:

modifying a delivery scheduling of at least one of the multipoint transmissions with respect to a receipt scheduling of the at least one multipoint transmissions to generate a modified delivery schedule;

delivering at least one of the multipoint transmissions in accordance with the modified delivery schedule; and providing, to the multipoint receivers in a target area, suspend information regarding which of the multipoint transmissions to the multipoint receivers in the target area will be interrupted or suspended.

15. A method of multipoint transmission, comprising:

sending content from one or more content sources to a multipoint transmission service center, said multipoint transmission service center controlling multipoint transmissions towards multipoint receivers;

sending said multipoint transmissions to a multipoint delivery entity downstream of said multipoint transmission service center;

said multipoint delivery entity detecting a presence of a delivery conflict with respect to scheduling among said multipoint transmissions downstream of said multipoint delivery entity, and performing a conflict resolution procedure in the event of a delivery conflict being detected, the conflict resolution procedure comprising:

modifying a delivery scheduling of at least one of the multipoint transmissions with respect to a receipt scheduling of the at least one multipoint transmissions to generate a modified delivery schedule;

delivering at least one of the multipoint transmissions in accordance with the modified delivery schedule; and providing, to the multipoint receivers in a target area, suspend information regarding which of the multipoint transmissions to the multipoint receivers in the target area will be interrupted or suspended.

* * * * *